(12) United States Patent
Cho

(10) Patent No.: US 10,371,825 B2
(45) Date of Patent: Aug. 6, 2019

(54) RADIATION DETECTOR AND COMPUTER TOMOGRAPHY APPARATUS INCLUDING THE SAME

(71) Applicant: SAMSUNG ELECTRONICS CO., LTD., Suwon-si (KR)

(72) Inventor: Min-kook Cho, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/577,423

(22) Filed: Dec. 19, 2014

(65) Prior Publication Data

US 2015/0185333 A1 Jul. 2, 2015

(30) Foreign Application Priority Data

Dec. 30, 2013 (KR) ........................ 10-2013-0167492

(51) Int. Cl.
*G01T 1/17* (2006.01)

(52) U.S. Cl.
CPC ...................................... *G01T 1/17* (2013.01)

(58) Field of Classification Search
CPC .......... G01T 1/247; G01T 1/17; A61B 6/4241
USPC ................... 250/394, 370.06; 378/5
See application file for complete search history.

(56) References Cited

U.S. PATENT DOCUMENTS

| | | | |
|---|---|---|---|
| 5,943,388 A * | 8/1999 | Tumer | G01V 5/0041 378/98.11 |
| 7,829,860 B2 | 11/2010 | Nygard et al. | |
| 9,354,331 B2 | 5/2016 | Sagoh et al. | |
| 2003/0138074 A1 | 7/2003 | Bruder | |
| 2005/0098735 A1 * | 5/2005 | Heismann | G01T 1/1611 250/370.12 |

(Continued)

FOREIGN PATENT DOCUMENTS

| | | |
|---|---|---|
| CN | 101501527 A | 8/2009 |
| CN | 102958439 A | 3/2013 |

(Continued)

OTHER PUBLICATIONS

Kraft, E. et al., "Counting and Integrating Readout for Direct Conversion X-ray Imaging—Concept Realization and First Prototype Measurements", 2005, IEEE Nuclear Science Symposium Conference Record, vol. 5, pp. 2761-2765.*

(Continued)

*Primary Examiner* — David P Porta
*Assistant Examiner* — Blake C Riddick
(74) *Attorney, Agent, or Firm* — Sughrue Mion, PLLC

(57) ABSTRACT

Provided is a radiation detector which includes a plurality of pixels for detecting radiation, each of the plurality of pixels including a radiation absorbing layer configured to convert incident radiation photons to electric signals; a plurality of comparators configured to compare each of the electric signals with a respective plurality of reference values, in order to classify the photons in a plurality of energy bands; and a plurality of counters configured to count and store the number of photons that are classified in each of the plurality of energy bands, and which have sizes which correspond to the plurality of reference values. Accordingly, the radiation detector may increase a measurable radiation amount without a requirement that sizes of the pixels or the sub-pixels are increased.

14 Claims, 12 Drawing Sheets

(b)

(56) References Cited

U.S. PATENT DOCUMENTS

| | | | | |
|---|---|---|---|---|
| 2006/0081785 | A1* | 4/2006 | Heismann | G01T 1/2928 250/370.09 |
| 2008/0099689 | A1* | 5/2008 | Nygard | G01T 1/2018 250/370.09 |
| 2009/0114831 | A1 | 5/2009 | Spartiotis et al. | |
| 2009/0285352 | A1* | 11/2009 | Schmitt | H01L 31/101 377/54 |
| 2009/0290680 | A1* | 11/2009 | Tumer | G01T 1/247 378/62 |
| 2010/0172466 | A1* | 7/2010 | Herrmann | G01T 1/17 378/19 |
| 2011/0168909 | A1* | 7/2011 | Nakao | H01L 27/14663 250/370.09 |
| 2013/0010921 | A1* | 1/2013 | Sagoh | A61B 6/032 378/19 |
| 2013/0105701 | A1* | 5/2013 | Han | G01T 1/247 250/394 |
| 2014/0016748 | A1* | 1/2014 | Spahn | G01T 1/247 378/62 |
| 2014/0175299 | A1* | 6/2014 | Spahn | G01T 1/247 250/394 |
| 2014/0254749 | A1* | 9/2014 | Steadman Booker | G01T 1/24 378/19 |
| 2014/0284492 | A1 | 9/2014 | Han et al. | |
| 2014/0328464 | A1* | 11/2014 | Proksa | G01N 23/046 378/62 |
| 2014/0328465 | A1* | 11/2014 | Herrmann | G01T 1/17 378/62 |
| 2015/0116564 | A1* | 4/2015 | Williams | H04N 5/347 348/308 |
| 2015/0185332 | A1* | 7/2015 | Herrmann | G01T 1/17 250/336.1 |

FOREIGN PATENT DOCUMENTS

| | | |
|---|---|---|
| CN | 103083029 A | 5/2013 |
| EP | 2589986 A2 | 5/2013 |
| KR | 1020100054863 A | 5/2010 |
| KR | 10-2012-0048721 A | 5/2012 |
| KR | 1020130048001 A | 5/2013 |
| KR | 1020130095016 A | 8/2013 |
| WO | 2008/020379 A2 | 2/2008 |
| WO | 2012/114250 A1 | 8/2012 |

OTHER PUBLICATIONS

Fischer, P. et al., "A Photon Counting Pixel Chip with Energy Windowing", 2000, IEEE Transactions on Nuclear Science, 47(3), pp. 881-884.*

Communication dated Jan. 30, 2015, issued by the Korean Intellectual Property Office in counterpart Korean Application No. 10-2013-0167492.

Communication dated Apr. 3, 2015, issued by the International Searching Authority in counterpart International Application No. PCT/KR2014/012993.

Communication dated Mar. 28, 2016, issued by the Korean Intellectual Property Office in counterpart Korean Application No. 10-2013-0167492.

Communication issued by the European Patent Office dated Sep. 6, 2017 in counterpart European Patent Application No. 14875907.9.

Communication dated Jun. 14, 2018, issued by the State Intellectual Property Office of P.R. China in counterpart Chinese Application No. 201480076606.1.

* cited by examiner (b)

RADIATION DETECTOR AND COMPUTER TOMOGRAPHY APPARATUS INCLUDING THE SAME

CROSS-REFERENCE TO RELATED APPLICATIONS

This application claims priority from Korean Patent Application No. 10-2013-0167492, filed on Dec. 30, 2013, in the Korean Intellectual Property Office, the disclosure of which is incorporated herein by reference in its entirety.

BACKGROUND

1. Field

One or more exemplary embodiments relate to a radiation detector for counting incident radiation photons and a computed tomography apparatus using the same, and more particularly, to a radiation detector for counting incident radiation photons after classifying them based on a plurality of energy bands and a computed tomography apparatus using the same.

2. Description of the Related Art

Medical image processing apparatuses are used for acquiring images of internal structures of an object. Medical image processing apparatuses are noninvasive examination apparatuses that show the structural details, internal tissues, and fluid flow of a human body. A user, such as a medical practitioner, can diagnose a health state and a disease of a patient by using a medical image which is output by a medical image processing apparatus.

Representative examples of apparatuses that use radiation to photograph an object in a patient include computed tomography (CT) apparatuses and X-ray apparatuses.

CT apparatuses provide a cross-sectional image of an object and express the internal structures (for example, organs such as a kidney, a lung, and/or other organs of the human body) of the object so as not to overlap each other, unlike general X-ray apparatuses. Therefore, CT apparatuses are widely used for accurately diagnosing a disease.

In medical image processing apparatuses for photographing an object by using radiation, a radiation detector for sensing radiation that has propagated through the object is an essential element. The radiation detector must accurately detect the radiation that has propagated through the object in order to precisely reconstruct a medical image of the object.

SUMMARY

One or more exemplary embodiments includes a radiation detector which is capable of expanding a range of a radiation amount that may be captured, and a computed tomography apparatus using the same.

Additional aspects will be set forth in part in the description which follows and, in part, will be apparent from the description, or may be learned by practice of the exemplary embodiments.

According to one or more exemplary embodiments, a radiation detector includes: a radiation absorbing layer configured to convert incident photons into electric signals; a plurality of comparators configured to compare each of the electric signals with a respective one of a plurality of reference values, in order to classify the photons in a plurality of energy bands; and a plurality of counters configured to count and store a respective number of photons that are classified in each of the plurality of energy bands, and which have sizes which correspond to the plurality of reference values.

The sizes of the plurality of counters may vary inversely with respect to the corresponding plurality of reference values.

Each of the plurality of counters may have a first bit depth if an energy band in which the corresponding photons are classified is a low energy band, and a second bit depth that is less than the first bit depth if the energy band in which the corresponding photons are classified is a high energy band.

The plurality of comparators may include: a first comparator configured to compare each of the electric signals with a first reference value; a second comparator configured to compare each of the electric signals with a second reference value; and a third comparator configured to compare each of the electric signals with a third reference value.

The plurality of counters may include: a first counter configured to count and store a number of photons which have energy values greater than the first reference value, based on an output of the first comparator; a second counter configured to count and store a number of photons which have energy values greater than the second reference value, based on an output of the second comparator; and a third counter configured to count and store a number of photons which have energy values greater than the third reference value, based on an output of the third comparator.

When the first reference value is less than the second reference value and the second reference value is less than the third reference value, a size of the first counter may be greater than a size of the second counter and the size of the second counter may be greater than a size of the third counter.

The respective size of each of the counters may vary based on at least one from among the reference values, a type of radiation being detected by the radiation detector, and an energy band of a reconstruction energy of the radiation being detected by the radiation detector.

The radiation detector may be configured to generate a computed tomography (CT) image.

The radiation absorbing layer may be disposed on a front portion of the radiation detector, and each of the plurality of comparators and each of the plurality of counters may be disposed on a rear portion of the radiation detector.

The radiation absorbing layer may be formed of at least one from among cadmium telluride (CdTe) and cadmium zinc telluride (CdZnTe).

According to one or more exemplary embodiments, a radiation detector includes a plurality of pixels configured to detect radiation, wherein each of the plurality of pixels includes: a radiation absorbing layer configured to convert incident photons into electric signals; a plurality of comparators configured to compare each of the electric signals with a respective one of a plurality of reference values, in order to classify the photons in a plurality of energy bands; and a plurality of counters configured to count and store a respective number of photons that are classified in each of the plurality of energy bands, and which have sizes which correspond to the plurality of reference values.

According to one or more exemplary embodiments, a radiation detector includes a plurality of pixels configured to detect radiation, wherein each of the plurality of pixels may include a respective plurality of sub-pixels, and each of the each respective plurality of sub-pixels may include: a radiation absorbing layer configured to convert incident photons into electric signals; a plurality of comparators configured to compare each of the electric signals with a respective one of a plurality of reference values, in order to classify the photons in a plurality of energy bands; and a plurality of counters configured to count and store a respective number of photons that are classified in each of the plurality of energy bands, and which have sizes which to the plurality of reference values.

According to one or more exemplary embodiments, a computed tomography (CT) apparatus includes: a radiation detector comprising a plurality of pixels, each of the plurality of pixels comprising a respective plurality of sub-pixels configured to detect radiation; and an image processor configured to reconstruct a CT image based on a number of photons detected by the radiation detector, wherein each of the each respective plurality of sub-pixels may include: a radiation absorbing layer configured to convert incident radiation photons into electric signals; a plurality of comparators configured to compare each of the electric signals with a respective one of a plurality of reference values, in order to classify the photons in a plurality of energy bands; and a plurality of counters configured to count and store a number of photons that are classified in each of the plurality of energy bands, and which have sizes which correspond to the plurality of reference values.

The image processor may be further configured to generate one image pixel value in the CT image by using a total number of photons counted by a sub-pixel group which comprises at least one sub-pixel from among the respective pluralities of sub-pixels.

The sub-pixel group may include a plurality of sub-pixels included in one pixel and arranged adjacent to each other, and the total number of the photons counted by the sub-pixel group corresponds to the generated one image pixel value in the CT image.

The plurality of sub-pixels included in at least one pair of pixels which are adjacent to each other may be divided into a plurality of sub-pixel groups, and the total number of photons counted by each of the plurality of sub-pixel groups may correspond to one image pixel value in the CT image.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
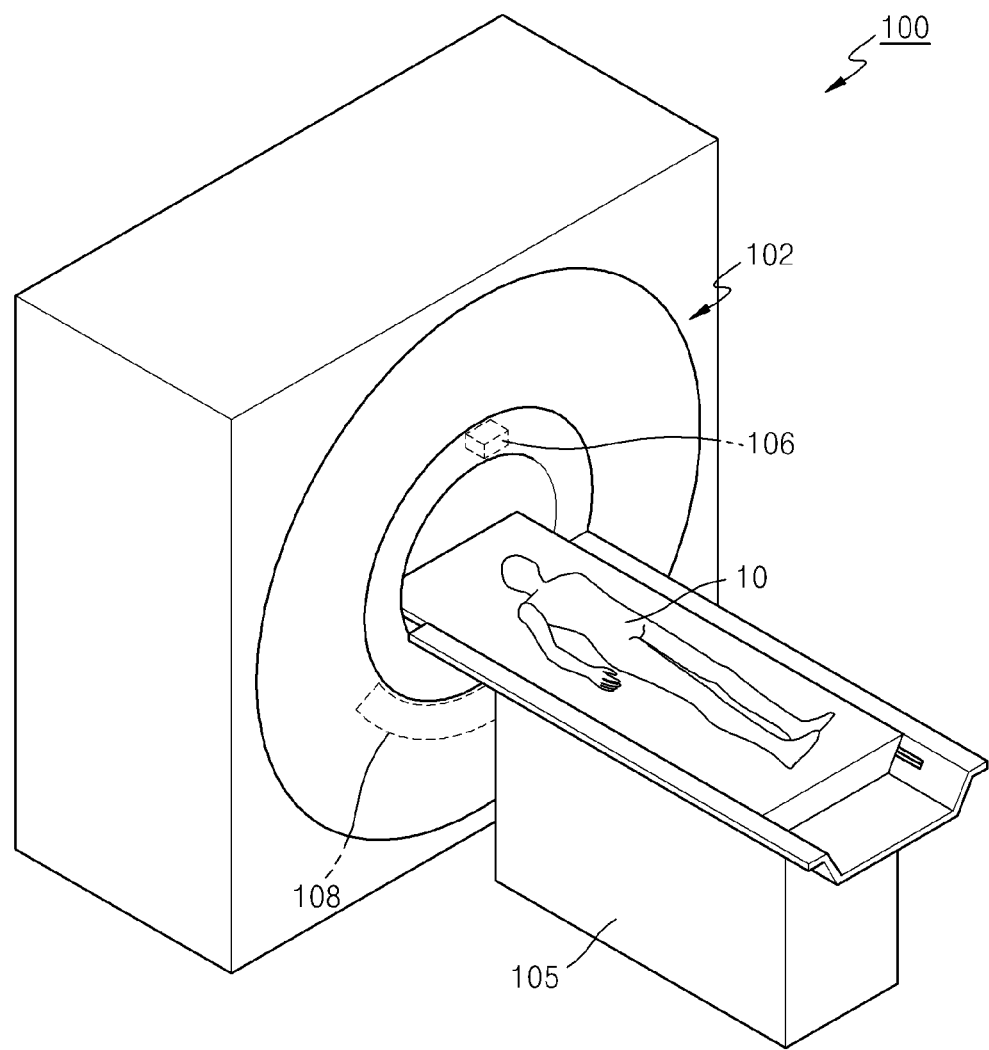
FIG. 1 is a schematic diagram of a general computed tomography (CT) system.

Advantages and features of one or more exemplary embodiments and methods of accomplishing the same may be understood more readily by reference to the following detailed description of the exemplary embodiments and the accompanying drawings. In this regard, the present exemplary embodiments may have different forms and should not be construed as being limited to the descriptions set forth herein. Rather, these exemplary embodiments are provided so that this disclosure will be thorough and complete and will fully convey the concept of the present exemplary embodiments to one of ordinary skill in the art, and the present inventive concept will only be defined by the appended claims. Like reference numerals refer to like elements throughout the specification. As used herein, the term "and/or" includes any and all combinations of one or more of the associated listed items. Expressions such as "at least one of," when preceding a list of elements, modify the entire list of elements and do not modify the individual elements of the list.

Hereinafter, the terms used in the specification will now be briefly defined, and the exemplary embodiments will now be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein are defined based on the meaning of the terms together with the description throughout the specification.

When a part "includes" or "comprises" an element, unless there is a particular description contrary thereto, the part can further include other elements, not excluding the other elements. Also, the term "unit," as used herein with respect to the exemplary embodiments, refers to a software component or hardware components such as a field-programmable gate array (FPGA) or an application-specific integrated circuit (ASIC), and which performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include any one or more of processes, functions, attributes, procedures, subroutines, segments of program code, drivers, firmware, micro codes, circuits, data, a database, data structures, tables, arrays, or variables. A function provided by the components and "units" may be associated with a smaller number of components and "units," or may be divided into additional components and "units."

Reference will now be made in detail to exemplary embodiments, examples of which are illustrated in the accompanying drawings. In this regard, the present exemplary embodiments may have different forms and should not be construed as being limited to the descriptions set forth herein. In the following description, well-known functions or constructions are not described in detail since they would obscure the exemplary embodiments with unnecessary detail.

Throughout the specification, an "image" may refer to multi-dimensional data formed of discrete image elements (e.g., pixels in a two-dimensional (2D) image and/or voxels in a three-dimensional (3D) image). For example, the image may include a medical image of an object which is captured by a computed tomography (CT) image-capturing apparatus.

Throughout the specification, a "CT image" may refer to an image generated by synthesizing a plurality of X-ray images that are obtained by photographing an object while a CT image-capturing apparatus rotates about at least one axis with respect to the object.

Throughout the specification, an "object" may include a human, an animal, and/or a part of a human or animal. For example, the object may include any one or more of organs such as the liver, heart, womb, brain, breast, abdomen, or the like, or a blood vessel. Also, the object may include a phantom. The term "phantom" refers to a material which has a volume that is very close to a density and effective atomic number of an organism, and may include a sphere phantom which has a characteristic similar to a physical body.

Throughout the specification, a "user" may be, but is not limited to, a medical expert including a medical doctor, a nurse, a medical laboratory technologist, a medical image expert, and/or a technician who repairs a medical apparatus.

Since a CT system is capable of providing a cross-sectional image of an object, the CT system may express an inner structure (e.g., an organ such as a kidney, a lung, and/or any other suitable organ of the human body) of the object without an overlap with other objects, as compared to a general X-ray capturing apparatus.

The CT system may obtain a plurality of pieces of image data with a thickness that is not greater than 2 mm for several tens to several hundreds of times per second, and then may process the plurality of pieces of image data, so that the CT system may provide a relatively accurate cross-sectional image of the object. According to the related art, only a horizontal cross-sectional image of the object can be obtained, but this issue has been overcome by using various image reconstruction methods. Examples of such 3D image reconstruction methods are:

- a shaded surface display (SSD) method: the SSD method is an initial 3D imaging method that only displays voxels which have a predetermined Hounsfield Units (HU) value.
- a maximum intensity projection (MIP)/minimum intensity projection (MinIP) method: the MIP/MinIP method is a 3D imaging method that only displays voxels having the greatest or smallest HU value from among voxels that constitute an image.
- a volume rendering (VR) method: the VR method is an imaging method capable of adjusting a color and transmittance of voxels that constitute an image, based on corresponding interest areas.
- a virtual endoscopy method: this method facilitates an endoscopy observation in a 3D image that is reconstructed by using the VR method or the SSD method.
- a multi-planar reformation (MPR) method: the MPR method is used to reconstruct an image into a different cross-sectional image. A user may reconstruct an image in any desired direction.
- An editing method: this method involves editing adjacent voxels so as to enable a user to easily observe an interest area in volume rendering.
- A voxel of interest (VOI) method: the VOI method only displays a selected area in volume rendering.

A CT system 100, according to an exemplary embodiment, will now be described with reference to FIG. 1. The CT system 100 may include devices which have any one or more of various forms.

FIG. 1 schematically illustrates the CT system 100. Referring to FIG. 1, the CT system 100 may include a gantry 102, a table 105, an X-ray generating unit (also referred to herein as an "X-ray generator") 106, and an X-ray detecting unit (also referred to herein an "X-ray detector") 108.

The gantry 102 may include the X-ray generating unit 106 and the X-ray detecting unit 108.

An object 10 may be positioned on the table 105.

The table 105 may configured to move in a predetermined direction (e.g., at least one of up-and-down and right-and-left directions) during a CT imaging procedure. Further, the table 105 may be configured to tilt and/or rotate by a predetermined number of angular degrees in a predetermined direction.

The gantry 102 may also be configured to tilt by a predetermined number of angular degrees in a predetermined direction.

Figure 2:
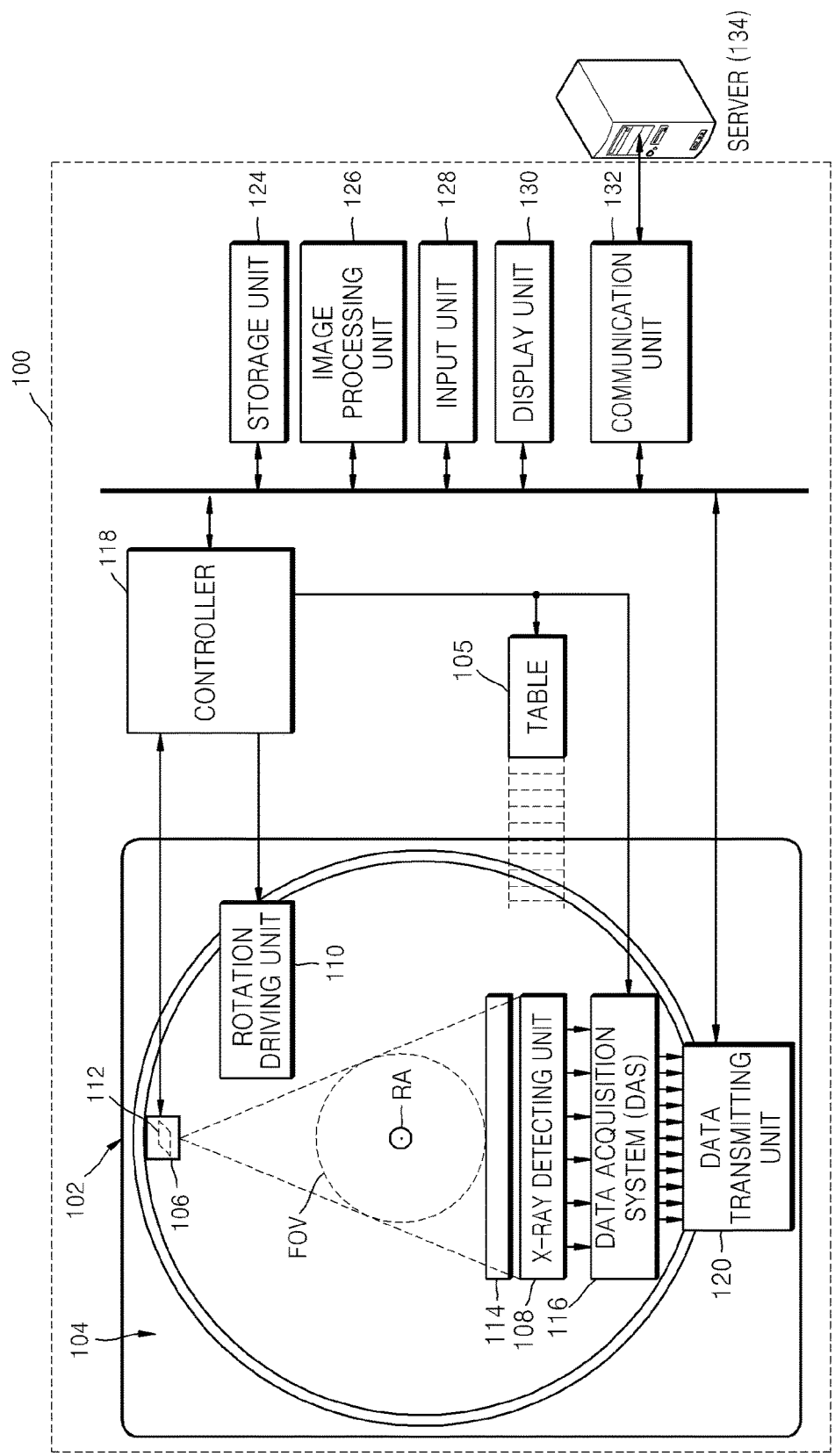
FIG. 2 is a diagram which illustrates a structure of a CT system, according to an exemplary embodiment.

FIG. 2 is a diagram which illustrates a structure of the CT system 100.

The CT system 100 may include the gantry 102, the table 105, a control unit (also referred to herein as a "controller") 118, a storage unit (also referred to herein as a "storage" and/or as a "storage device") 124, an image processing unit (also referred to herein as an "image processor") 126, an input unit (also referred to herein as an "input device") 128, a display unit (also referred to herein as a "display" and/or as a "display device") 130, and a communication unit (also referred to herein as a "communicator" and/or as a "communication device") 132.

As described above, the object 10 may be positioned on the table 105. In the present exemplary embodiment, the table 105 may be configured to move in a predetermined direction (e.g., at least one of up, down, right, and left directions) via a control implemented by the control unit 118.

The gantry 102 may include a rotating frame 104, the X-ray generating unit 106, the X-ray detecting unit 108, a rotation driving unit (also referred to herein as a "rotation driver") 110, a data acquisition system (DAS) 116, and a data transmitting unit (also referred to herein as a "data transmitter") 120.

The gantry 102 may include the rotating frame 104 which has a loop shape capable of rotating with respect to a predetermined rotation axis (RA). Further, the rotating frame 104 may have a disc shape.

The rotating frame 104 may include the X-ray generating unit 106 and the X-ray detecting unit 108 that are arranged to face each other so as to have predetermined fields of view (FOV). The rotating frame 104 may also include an anti-scatter grid 114. The anti-scatter grid 114 may be positioned between the X-ray generating unit 106 and the X-ray detecting unit 108.

In a medical imaging system, X-ray radiation that reaches a detector (or a photosensitive film) includes not only attenuated primary radiation that forms a valuable image, but also scattered radiation that deteriorates the quality of the image. Thus, in order to transmit the primary radiation and to attenuate the scattered radiation, the anti-scatter grid 114 may be positioned between a patient and the detector (or the photosensitive film).

For example, the anti-scatter grid 114 may be formed by alternately stacking lead foil strips and an interspace material such as a solid polymer material, solid polymer, or a fiber composite material. However, formation of the anti-scatter grid 114 is not limited thereto.

The rotating frame 104 may receive a driving signal from the rotation driving unit 110 and may cause the X-ray generating unit 106 and the X-ray detecting unit 108 to rotate by a predetermined rotation speed. The rotating frame 104 may receive the driving signal and power from the rotation driving unit 110 while the rotating frame 104 contacts the rotation driving unit 110 via a slip ring (not shown). In addition, the rotating frame 104 may receive the driving signal and power from the rotation driving unit 110 via wireless communication.

The X-ray generating unit 106 may receive a voltage and current from a power distribution unit (PDU) (also referred to herein as a "power distributor") (not shown) via a slip ring (not shown) and a high voltage generating unit (also referred to herein as a "high voltage generator") (not shown), and then may generate and emit an X-ray. When the high voltage generating unit supplies a predetermined voltage (hereinafter, referred to as the tube voltage) to the X-ray generating unit 106, the X-ray generating unit 106 may generate X-rays having a plurality of energy spectrums that correspond to the tube voltage.

The X-ray generated by the X-ray generating unit 106 is collimated by a collimator 112 and then emitted.

The X-ray detecting unit 108 may be positioned to face the X-ray generating unit 106. The X-ray detecting unit 108 may include a plurality of X-ray detecting devices. Each of the plurality of X-ray detecting devices may establish one channel, but one or more exemplary embodiments are not limited thereto.

The X-ray detecting unit 108 may detect the X-ray that is generated by the X-ray generating unit 106 and transmitted via the object 10, and may generate an electrical signal corresponding to the intensity of the detected X-ray.

The X-ray detecting unit 108 may include an indirect-type X-ray detector which is configured to detect radiation after converting the radiation into light, and a direct-type X-ray detector configured to detect radiation after directly converting the radiation into electric charges. The indirect-type X-ray detector may use a scintillator. Further, the direct-type X-ray detector may use a photon counting detector. The DAS 116 may be connected to the X-ray detecting unit 108. The electrical signal generated by the X-ray detecting unit 108 may be wiredly or wirelessly collected by the DAS 116. In addition, the electrical signal generated by the X-ray detecting unit 108 may be provided to an analog-to-digital converter (not shown) via an amplifier (not shown).

According to a slice thickness and/or the number of slices, only some of a plurality of pieces of data collected by the X-ray detecting unit 108 may be provided to the image processing unit 126 via the data transmitting unit 120, or the image processing unit 126 may select only some of the plurality of pieces of data.

The digital signal may be provided to the image processing unit 126 via the data transmitting unit 120. The digital signal may be wiredly or wirelessly provided to the image processing unit 126.

The control unit 118 may control an operation of each of modules in the CT system 100. For example, the control unit 118 may control operations of the table 105, the rotation driving unit 110, the collimator 112, the DAS 116, the storage unit 124, the image processing unit 126, the input unit 128, the display unit 130, the communication unit 132, and/or any other component modules of the CT system.

The image processing unit 126 may receive data (e.g., pure data before a processing operation), which is obtained from the DAS 116, via the data transmitting unit 120, and may perform pre-processing.

The pre-processing may include a process for correcting a sensitivity irregularity between channels, and/or a process for correcting a signal loss due to a rapid decrease of signal strength or due to an X-ray absorbing material, such as metal or the like.

Data output from the image processing unit 126 may be referred to as raw data or projection data. The projection data and image-capturing conditions (e.g., the tube voltage, an image-capturing angle, etc.) during acquisition of the data may be stored together in the storage unit 124.

The projection data may include a group of data values that correspond to the intensity of the X-ray that propagates through the object 10. For convenience of description, it is assumed that a group of a plurality of pieces of projection data that are simultaneously obtained from all channels by a same image-capturing degree is referred as a projection data set.

The storage unit 124 may include at least one storage medium from among a flash memory-type storage medium, a hard disk-type storage medium, a multimedia card micro-type storage medium, card-type memories (e.g., an SD card, an XD memory, and the like), Random Access Memory (RAM), Static Random Access Memory (SRAM), Read-Only Memory (ROM), Electrically Erasable Programmable Read-Only Memory (EEPROM), Programmable Read-Only Memory (PROM) magnetic memory, a magnetic disc, and an optical disc.

The image processing unit 126 may reconstruct a cross-sectional image of to the object 10 by using the projection data set. The cross-sectional image may include a 3D image. In particular, the image processing unit 126 may reconstruct the 3D image of the object 10 by using a cone beam reconstruction method and/or any other suitable methodology, based on the projection data set.

The input unit 128 may receive an external input with respect to an X-ray tomography imaging condition, image processing conditions, and/or the like. For example, the X-ray tomography imaging conditions may include any one or more of tube voltages, energy value setting with respect to a plurality of X-rays, selection of an image-capturing protocol, selection of an image reconstruction method, setting of a FOV area, the number of slices, a slice thickness, parameter setting with respect to image post-processing, and/or the like. Further, the image processing conditions may include a resolution of an image, attenuation coefficient setting with respect to the image, setting of an image combining ratio, and/or the like.

The input unit 128 may include a device configured to receive a predetermined input from an external source. For example, the input unit 128 may include any one or more of a microphone, a keyboard, a mouse, a joystick, a touch pad, a touch pen, a voice recognition device, a gesture recognition device, and/or the like.

The display unit 130 may be configured to display an X-ray tomography image which has been reconstructed by the image processing unit 126.

Exchanges of data, power, or the like between the aforementioned elements may be performed by using at least one of wired communication, wireless communication, and optical communication.

The communication unit 132 may perform communication with an external device, an external medical apparatus, and/or any other suitable type of device, via a server 134 or the like. The communication will now be described with reference to FIG. 3.

Figure 3:
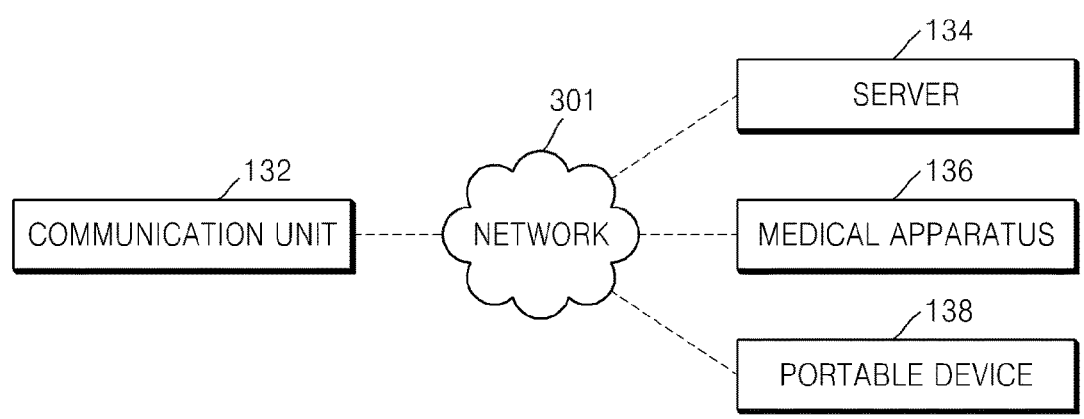
FIG. 3 is a block diagram of a communication unit.

FIG. 3 is a block diagram of the communication unit 132.

The communication unit 132 may be wiredly or wirelessly connected to a network 301 and therefore may perform communication with the server 134, an external medical apparatus 136, and/or an external portable device 138. The communication unit 132 may exchange data with a hospital server or other medical apparatuses in a hospital connected via a Picture Archiving and Communication System (PACS).

Further, the communication unit 132 may perform data communication with the portable device 138 and/or the like, according to a Digital Imaging and Communications in Medicine (DICOM) standard.

The communication unit 132 may transmit and receive data related to diagnosing the object 10 via the network 301. Further, the communication unit 132 may transmit and receive a medical image obtained from the external medical apparatus 136 such as a magnetic resonance imaging (MRI) apparatus, an X-ray apparatus, and/or any other suitable device.

Furthermore, the communication unit 132 may receive a diagnosis history or a medical treatment schedule of a patient from the server 134 and may use the diagnosis history or the medical treatment schedule in a clinical diagnosis of the patient. Further, the communication unit 132 may perform data communication not only with the server 134 or the external medical apparatus 136 in a hospital, but also with the portable device 138 of a user or patient.

In addition, the communication unit 132 may transmit information about a device error, information about a quality control status, and/or the like to a system manager or a service manager via the network 301, and may receive feedback corresponding to the information.

Figure 4:
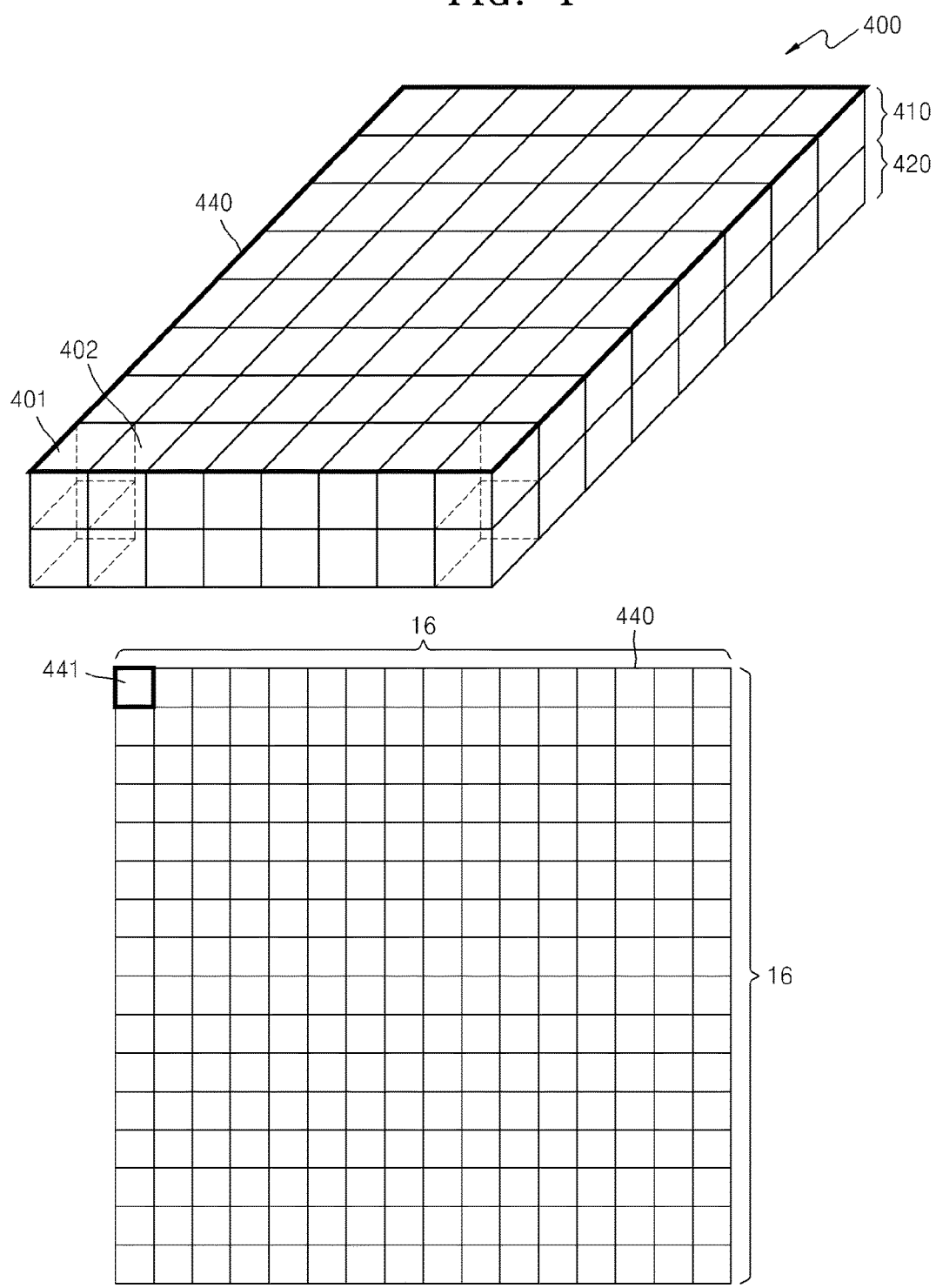
FIG. 4 is a diagram which shows a radiation detector, according to an exemplary embodiment.

FIG. 4 is a diagram which illustrates a radiation detector 400, according to an exemplary embodiment.

The radiation detector 400, according to an exemplary embodiment, is a counting detector that is configured to convert incident radiation into an electric charge via a direct method in order to detect the radiation. In detail, the radiation detector 400 is a photon counting detector that is configured to convert an incident photon into an electrical signal, and to count a number of converted electrical signals which correspond to the photons. Further, the radiation detector 400 according to the present exemplary embodiment is a radiation detector configured to measure the multi-energy of radiation.

The radiation detector for measuring the multi-energy of radiation classifies incident photons in a plurality of bands, based on an energy magnitude thereof, and reconstructs a medical image by using the number of photons that are classified in the energy bands.

Referring to FIG. 4, the radiation detector according to the present exemplary embodiment includes a plurality of pixels 401 and 402 which are configured for detecting radiation. Each of the plurality of pixels 401 and 402 may include a unit detector which is configured for sensing the radiation and classifying and counting the photons according to the energy band.

In detail, the radiation detector 400 may be used to generate a CT image, and may correspond to the X-ray detecting unit 108 shown in FIGS. 1 and 2.

The plurality of pixels 401 and 402 are arranged as gratings, as shown in FIG. 4, and may have tetrahedral structures having the same sizes as each other. In FIG. 4, the radiation detector 400 includes 256 pixels 441 (16×16=256) as an example.

In each of the plurality of pixels 401 and 402, a radiation absorbing layer 410 is disposed on a front side, and a comparator and a counter which are configured for counting the radiation incident to the radiation absorbing layer 410 and storing the number of radiation photons may be disposed in a rear side 420.

In particular, the radiation that has propagated through the object is incident to a front surface 440 of the radiation detector 400, and the radiation absorbing layer 410 disposed on the front surface portion of the radiation detector 400 absorbs the incident radiation.

A front surface of one pixel (for example, the pixel 401) may have a size of about 1 mm×1 mm=1 mm$^2$. In particular, in one pixel 401, a length of a side may range from 0.9 mm to 1.1 mm.

Figure 5:
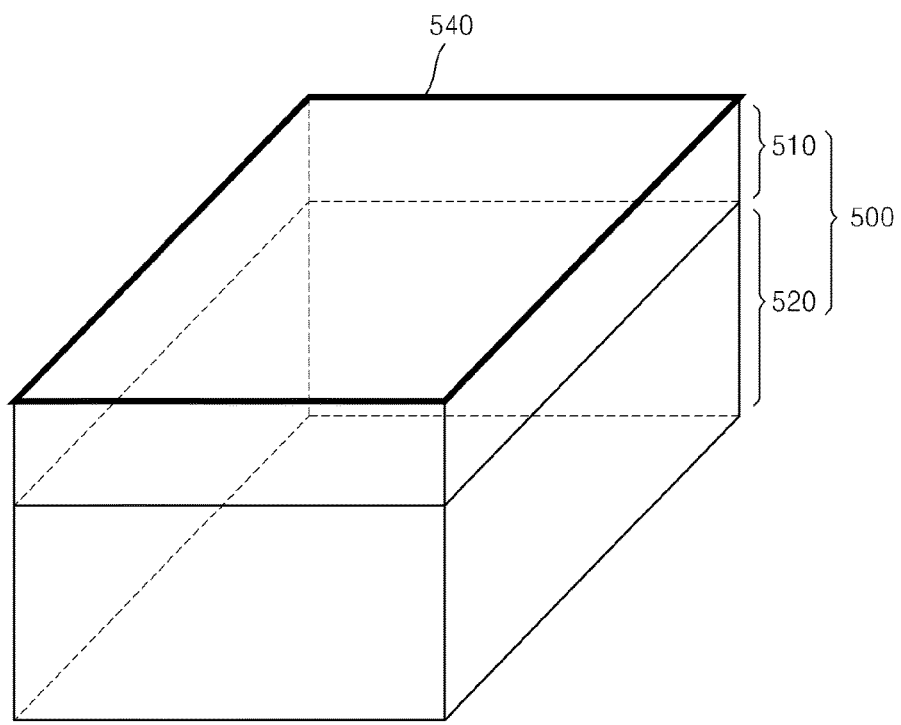
FIG. 5 is a diagram which illustrates a pixel shown in FIG. 4.
Figure 5:
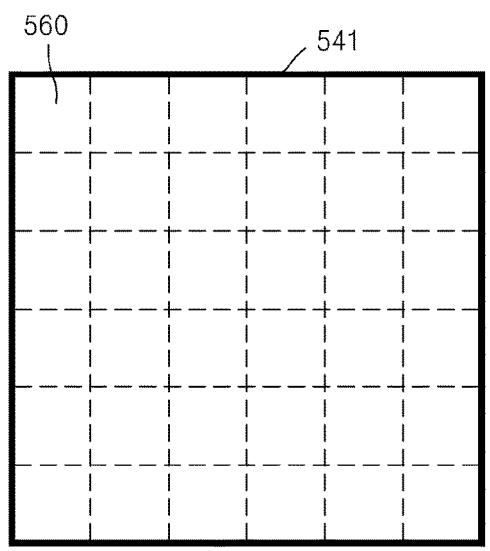
Figure 5:
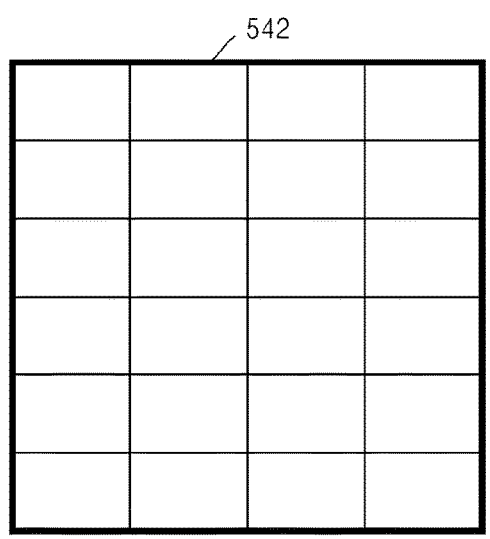

FIG. 5 is a diagram which shows a pixel 401 of FIG. 4.

Referring to FIG. 5, one pixel 500 may include a plurality of sub-pixels. When a pixel includes a plurality of sub-pixels, a unit detector which is configured for sensing and processing the radiation may correspond to a sub-pixel.

For example, one pixel 500 may include 24 pixels (4×6=24), 25 pixels (5×5=25), or 36 pixels (6×6=36).

The radiation detector which is included in a CT system should be able to absorb a predetermined number of photons when performing a photographing operation under predetermined conditions. The number of photons that are absorbed by one pixel having a unit area of 1 mm$^2$ may be determined by the following spectrum modeling.

In a photon counting detector included in a CT system of a hybrid type, the photographing conditions may include a tube voltage of 120 kVp and a tube current of 200 mA or greater. Further, a filter condition may include an aluminum equivalent thickness of about 5.6 mm.

Under the above photographing conditions, the number of photons that are absorbed and counted by one pixel 500 may be calculated according to an X-ray spectrum modeling process which is based on a tungsten anode spectral model (TASMIP).

In detail, the number of photons that are absorbed by one pixel for one second may be within a range of about 0.2 billion to about 0.5 billion. In this case, one pixel may have a unit area of 1 mm$^2$.

For example, the spectrum modeling process may be designed as follows.

| Item | Modeled value | Unit |
| --- | --- | --- |
| Mean photon energy | 60.605 | [keV] |
| 1st half value layer | 6.886 | [mm Al] |
| Exposure | 7.739 | [mR/mAs] @ 1.0 [m] |
| Air Kerma | 67.799 | [uGy/mAs] @ 1.0 [m] |
| Fluence | 2,004,955 | [photons/mm$^2$/mAs] @ 1.0 [m] |

In the spectrum modeling process, the mean photon energy has a modeled value of 60.605 keV (kilo electron volt), and the 1st half value layer has a modeled value of 6.886 mm Al. In addition, the exposure amount is equal to 7.739 mR/mAs when measured from a distance of one meter, and the air Kerma has a modeled value of 67.799 uGy/mAs when measured from a distance of one meter. In the above modeling conditions, fluence that is incident after passing through a unit area of 1 mm$^2$ has a modeled value of 2,004,955 photons/mm$^2$/mAs when measured from a distance of one meter.

According to the spectrum modeling process, the number of photons which are generated when irradiating an X-ray of 1 mA is 2,004,955 photons/mm$^2$/mAs, that is, roughly 2 mega photons/mm$^2$/mAs. Hereinafter, M is equal to one million.

In a case of a detector having an absorption dose of 200 mA, the number of photons incident to a unit area of 1 mm$^2$ is calculated as 200×2004955 photons/mm$^2$/mAs, that is, about 400 M photons/mm$^2$/mAs. Further, when the detector operates with an absorption dose of 100 mA in consideration of an exposure reduction by 50%, the number of photons incident to the unit area of 1 mm$^2$ is calculated as 100× 2004955 photons/mm$^2$/mAs, that is, about 200 M photons/mm$^2$/mAs.

Therefore, one pixel 500 having a unit area of 1 mm$^2$ may absorb and count 200 M photons or greater per second.

Referring to FIG. 5, the pixel 500 includes 36 sub-pixels (6×6 sub-pixels) as shown in item 541. In particular, a front surface 540 of the pixel 500 may correspond to the reference numeral 541. As described above, in a case where the pixel 500 absorbs and counts about 200 M photons per second and includes 36 sub-pixels, one sub-pixel may absorb and count approximately 5.56 M photons (200/36=5.56) per second.

Further, referring to FIG. 5, the pixel 500 may include 24 sub-pixels (6×4 sub-pixels) as shown in item 542. In particular, the front surface 540 of the pixel 500 may correspond to the reference numeral 542. As described above, if the pixel 500 absorbs and counts about 200 M photons per second and includes 24 sub-pixels, one sub-pixel may absorb and count approximately 8.33 M photons (200/24=8.33) per second.

Still further, the pixel 500 may include 25 sub-pixels (5×5 sub-pixels). As described above, if the pixel 500 absorbs and counts about 200 M photons per second and includes 24 sub-pixels, one sub-pixel may absorb and count approximately 8 M photons (200/25=8) per second.

Figure 6:
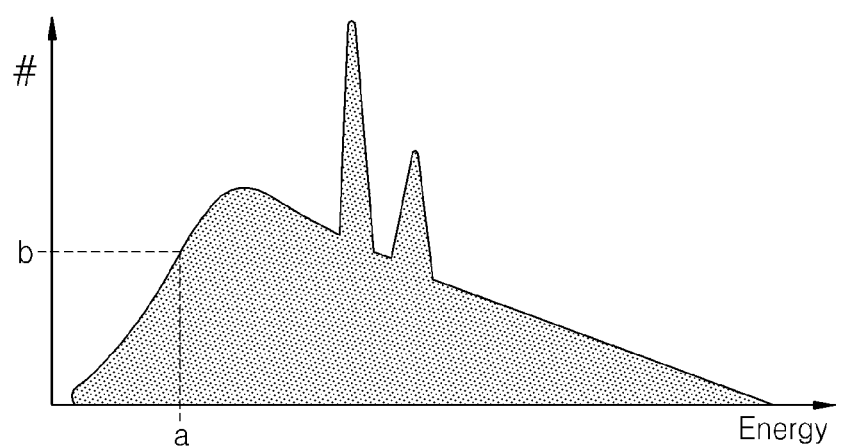
FIG. 6 is a diagram which illustrates an energy distribution of a photon incident to a radiation detector.

FIG. 6 is a graph which illustrates an energy distribution of photons incident to the radiation detector. In FIG. 6, the X-axis denotes an energy intensity of the photon, and the y-axis denotes the number of photons incident to the radiation detector for a predetermined area. For example, if a number b of photons are incident onto a predetermined area, each of the photons has an energy intensity which is equal to a.

The X-ray generating unit 106 shown in FIG. 1 may generate X-rays after receiving a voltage and a current from a high voltage generator (not shown) and emit the generated X-rays. In particular, the X-rays emitted from the X-ray generating unit 106 may have energies of various intensities, as shown in FIG. 6.

The radiation detector 400 classifies incident photons based on the respective energy intensities of the photons in order to count the photons.

Figure 7:
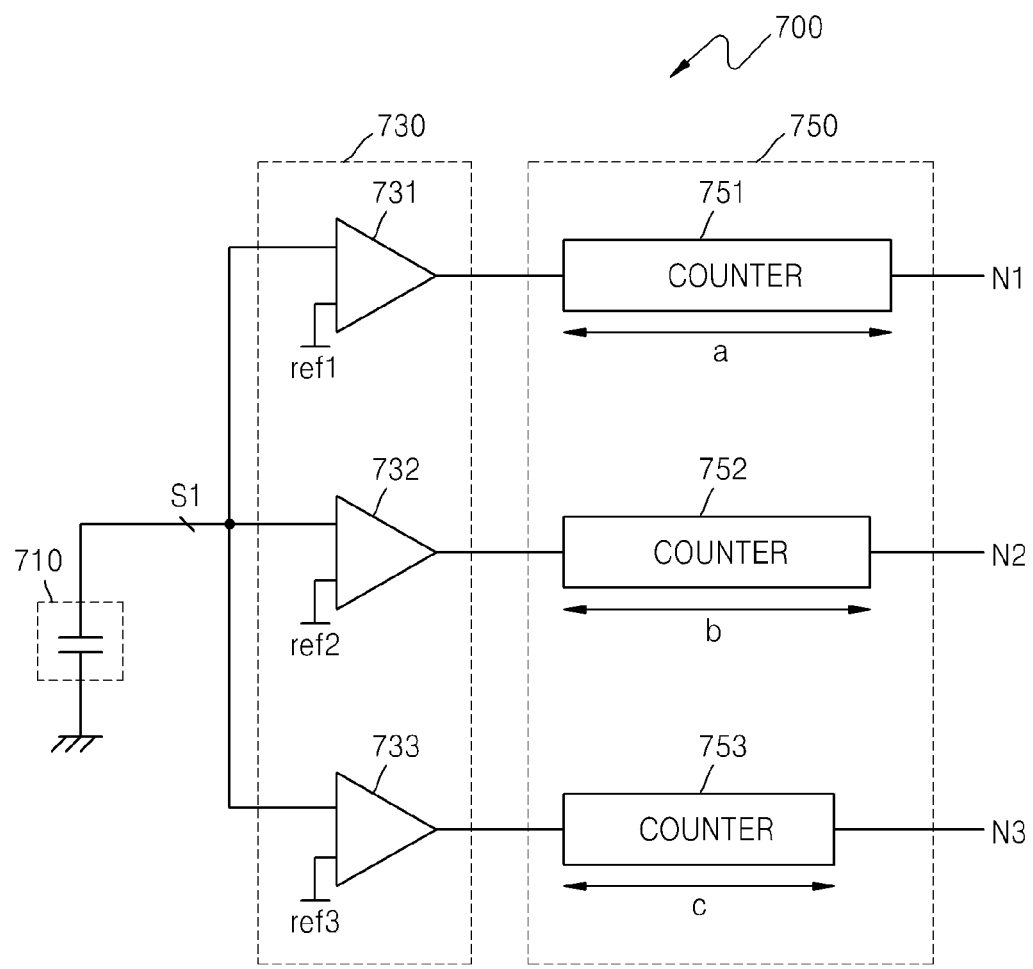
FIG. 7 is a diagram which shows a radiation detector, according to another exemplary embodiment.

FIG. 7 is a diagram of a radiation detector 700, according to another exemplary embodiment.

Referring to FIG. 7, the radiation detector 700 includes a radiation absorbing layer 710, a plurality of comparators 730, and a plurality of counter 750.

The radiation absorbing layer 710 converts incident radiation photons into electrical signals.

The plurality of comparators 730 compare each of the electrical signals with a respective plurality of reference values ref1, ref2, and ref3, in order to classify the photons in a plurality of energy bands.

The plurality of counters 750 count the number of photons that are classified in each of the plurality of energy bands, and then store the counted number of photons which have magnitudes which correspond to the plurality of reference values ref1, ref2, and ref3.

In detail, FIG. 7 shows a unit detector 700 that is configured to sense the radiation photons and to count the radiation photons according to the energy bands thereof.

Further, the unit detector 700 may correspond to the pixel 401 or the sub-pixel 560 described above with reference to FIGS. 4 and 5. That is, the pixel 401 may be the unit detector 700, or the sub-pixel 560 may be the unit detector 700.

Referring to FIG. 7, the unit detector 700 may include the radiation absorbing layer 710, the plurality of comparators 730, and the plurality of counters 750. In FIG. 7, three comparators 731, 732, and 733 and three counters 751, 752, and 753 are included in the unit detector 700 as an example. Hereinafter, a case where the unit detector 700 includes three comparators and classifies the incident photons in three energy bands in order to count the photons will be described as an example.

Further, the radiation absorbing layer 710 may be disposed on the front side 410 of the radiation detector 400 shown in FIG. 4. In addition, the plurality of comparators 730 and the plurality of counters 750 may be disposed on the rear side 420 of the radiation detector 400.

The radiation absorbing layer 710 converts incident photons into electric signals S1. In more detail, the radiation absorbing layer 710 converts incident X-ray photons into electric signals. For example, the radiation absorbing layer 710 may convert an X-ray photon into a hole-electron pair in order to generate an electric signal S1 which corresponds to an energy of the incident X-ray photon. The electric signal S1 may be a voltage signal or a current signal. Hereinafter, a case where the electric signal S1 is a voltage signal will be described as an example.

In addition, the radiation absorbing layer 710 respectively transfers the electric signal S1 to the plurality of comparators 731, 732, and 733.

In more detail, the radiation absorbing layer 710 converts the radiation into the electric signal S1 via a direct method. The radiation absorbing layer 710 may be formed of cadmium telluride (CdTe). Alternatively, the radiation absorbing layer 710 may be formed of cadmium zinc telluride (CdZnTe).

Further, if a front area which receives the incident radiation in the radiation absorbing layer 710 measures about 1 mm$^2$, the radiation absorbing layer 710 may absorb about 200 M photons for one second in an area of 1 mm$^2$ as described above. In addition, if the unit detector 700 shown in FIG. 7 is included in one sub-pixel and one pixel includes m sub-pixels, the radiation absorbing layer 710 may absorb about (200/m) M photons for one second as described above.

The plurality of comparators 731, 732, and 733 classify the photons absorbed by the radiation absorbing layer 710 based on the respective energy intensities. In particular, the plurality of comparators 731, 732, and 733 respectively compare the electric signal S1 which is received from the radiation absorbing layer 710 with the plurality of reference values ref1, ref2, and ref3 in order to classify the incident photons with respect to a plurality of energy bands.

In particular, the first comparator 731 compares the electric signal S1 with the first reference value ref1, and when the electric signal S1 is greater than the reference value ref1, the first comparator 731 may output a signal, which is to be accumulated and counted by the first counter 751, to the first counter 751.

Further, the second comparator 732 compares the electric signal S1 with the second reference value ref2, and when the electric signal S1 is greater than the second reference value ref2, the second comparator 732 may output a signal, which is to be accumulated and counted by the second counter 752, to the second counter 752.

Still further, the third comparator 733 compares the electric signal S1 with the third reference value ref3, and when the electric signal S1 is greater than the third reference value ref3, the third comparator 733 may output a signal, which is to be accumulated and counted by the third counter 753, to the second counter 753.

For example, when the comparator (for example, the first comparator 731) is biased to a +Vh voltage and a −Vh voltage, the comparator 731 may output the +Vh voltage as a logic high level signal and output the −Vh voltage as a logic low level signal. When a level of the electric signal S1 which corresponds to the photon is higher than that of the first reference value ref1, the comparator 731 may output the +Vh voltage which corresponds to the logic high level, and when the +Vh voltage is input to the counter 751, the counter 751 may increment the number of photons by one and count the number of photons. Conversely, when a level of the electric signal S1 which corresponds to the photon is lower than that of the first reference value ref1, the comparator 731 may output the −Vh voltage, and when the −Vh voltage is input to the counter 751, the counter 751 may accumulate the number of photons without counting the number of photons.

The plurality of reference values ref1, ref2, and ref3 are reference values for classifying the photons according to the energy intensities, and may vary based on any one or more of a type of the incident radiation, a type of reconstruction image or an energy band of the reconstruction image, settings of a user, and/or any other suitable criteria.

For example, when the X-ray photon is incident to the radiation absorbing layer 710, the first reference value ref1 may be set as 30 keV, the second reference value ref2 may be set as 60 keV, and the third reference value may be set as 80 keV in consideration of the energy intensity of the X-ray photon.

In addition, the plurality of counters 751, 752, and 753 may count, based on the signals which are respectively output from the plurality of comparators 731, 732, and 733, the number of photons that are classified according to the energy intensities. Each of the plurality of counters 751, 752, and 753 may include a counter and/or a counting memory for counting the number of photons.

In particular, the plurality of counters 751, 752, and 753 count and store the respective numbers of photons that are classified in each of the plurality of groups, and may have respective sizes which correspond to the reference values used to classify the photons.

As described above, in a case where the first reference value ref1 is set as 30 keV, the second reference value ref2 is set as 60 keV, and the third reference value ref3 is set as 80 keV, the first counter 751 counts the number of photons which have an energy of 30 keV or greater, and stores the number of counted photons. In addition, the second counter 732 counts the number of photons which have an energy of 60 keV or greater, and the third counter 733 counts the number of photons which have an energy of 80 keV or greater.

In detail, the size of each of the plurality of counters 751, 752, and 753 may vary based on the reference value that is applied to classify the photons to be counted. Further, a minimum energy value of the photon that is counted by each of the plurality of counters 751, 752, and 753 may correspond to the reference value applied to each of the comparators 731, 732, and 733. For example, the size of the first counter 751 may vary based on the first reference value ref1 used by the first comparator 731. In addition, the size of the second counter 752 may vary based on the second reference value ref2 used by the second comparator 732. In addition, the size of the third counter 753 may vary based on the third reference value ref3 used by the third comparator 733.

The size of the counter may vary inversely with respect to the reference value used to classify the photons. In particular, the size of the counter may vary inversely with respect to the reference value applied to the comparator connected to the counter. For example, in a case where the first reference value ref1 is set as 30 keV, the second reference value ref2 is set as 60 keV, and the third reference value ref3 is set as 80 keV, the size of the counter may be reduced when the reference value is greater and the size of the counter may be increased when the reference value is less. In the above example, the first counter 751 has the largest size and the third counter 753 has the smallest size.

The size of the counter will be described in detail below with reference to FIGS. 8 and 9.

Figure 8:
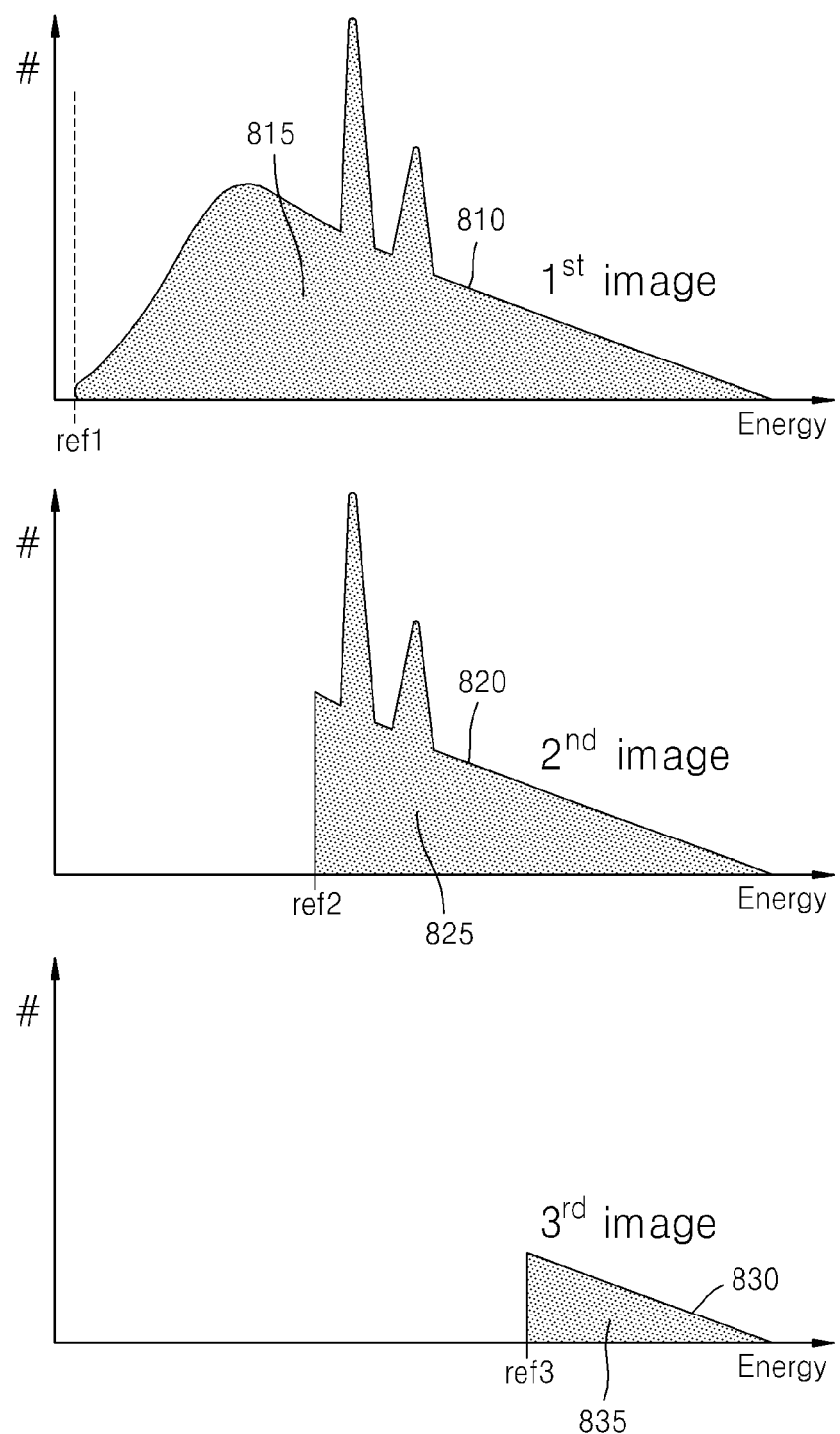
FIG. 8 is a diagram which shows a radiation detector, according to another exemplary embodiment.

FIG. 8 shows a set of graphs which illustrate operations of the radiation detector, according to an exemplary embodiment. In the graphs of FIG. 8, the x-axis indicates an energy value of the photon, and the y-axis indicates the number of photons.

Referring to a graph 810, the first comparator 731 classifies photons which have energy of the first reference value ref1 or greater, and the first counter 751 counts the number of the photons that are classified as having the energy of the first reference value ref1 or greater and stores the number of photons. The number of photons that are stored by the first counter 751 corresponds to an area 815 of the graph 810. In addition, the number of photons counted by the first counter 751 is used to reconstruct a first image in a multi-energy CT image.

Further, referring to a graph 820, the second comparator 732 classifies photons which have an energy that is equal to the second reference value ref2 or greater, and the second counter 752 counts the number of photons classified by the second comparator 732 and stores the number of photons. The number of photons that are stored by the second counter 752 corresponds to an area 825 of the graph 820. In addition, the number of photons counted by the second counter 752 is used to reconstruct a second image in the multi-energy CT image.

Referring to a graph 830, the third comparator 733 classifies photons which have an energy value of the third reference value ref3 or greater, and the third counter 753 counts the number of photons classified by the third comparator 733 and stores the number of photons. The number of photons that are stored by the third counter 753 corresponds to an area 835 of the graph 830. In addition, the number of photons counted by the third counter 753 is used to reconstruct a third image in the multi-energy CT image.

In detail, the size of each of the plurality of counters 751, 752, and 753 included in the unit detector 700 may be determined to vary proportionally with respect to the total number of photons having the energy values that are equal to or greater than a predetermined reference value.

Figure 9:
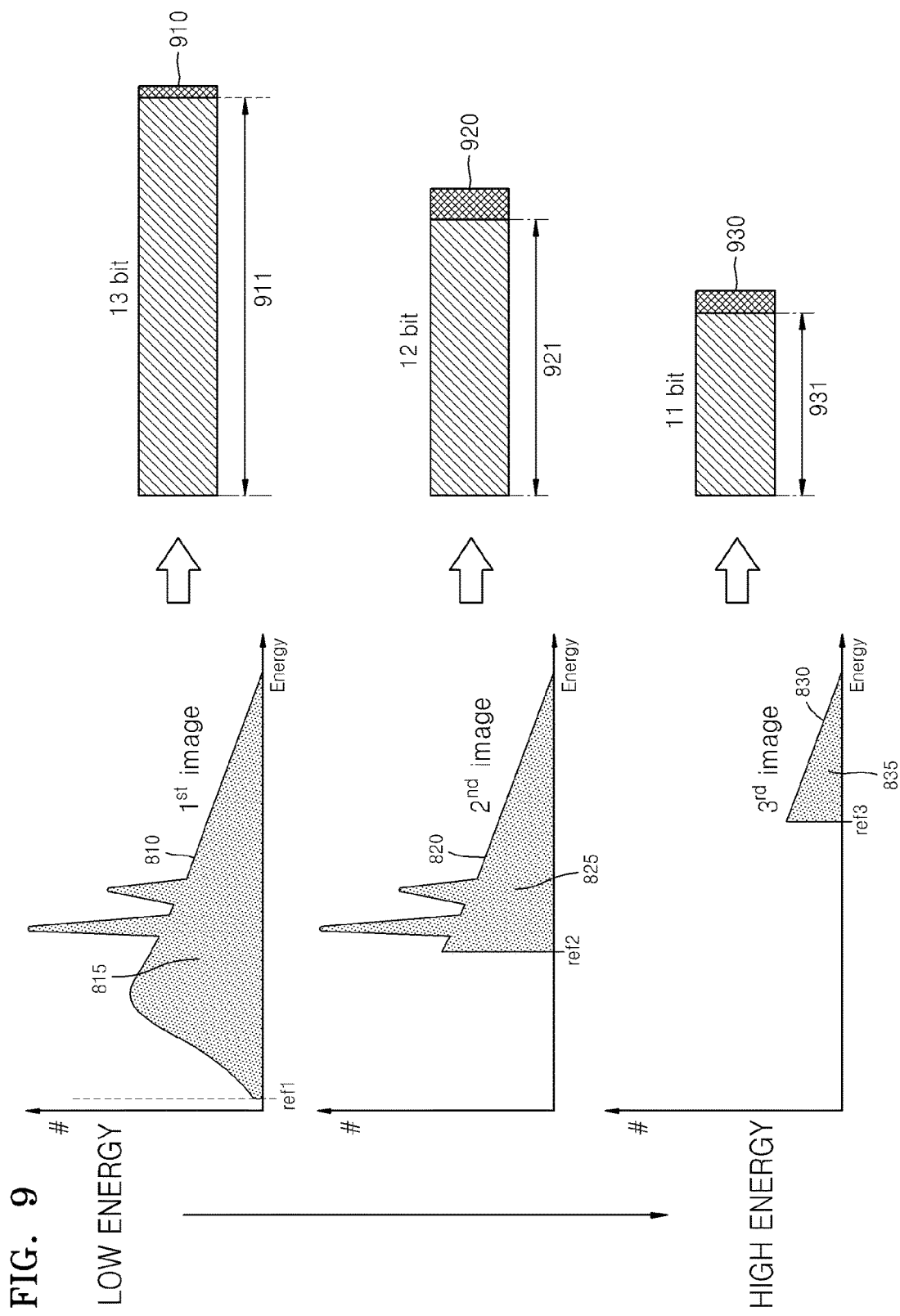
FIG. 9 is a diagram which shows a radiation detector, according to another exemplary embodiment.

FIG. 9 is a diagram which illustrates a radiation detector, according to another exemplary embodiment. A first counter 910, a second counter 920, and a third counter 930 respectively correspond to the first counter 751, the second counter 752, and the third counter 753 described with reference to FIG. 7. Therefore, detailed descriptions as those shown in FIG. 7 are not provided here.

Referring to FIG. 9, sizes of the first, second, and third counters 910, 920, and 930 may vary based on respective energy values of the photons that are classified, as described above.

In detail, if the energy level of the classified photons is in a low energy band, the counter has a first bit depth, and if the energy level of the classified photons is in a high energy band, the counter may have a second bit depth that is less than the first bit depth.

Referring to FIG. 9, the first counter 910 has a first reference value of 30 keV that is smaller than the second and third reference values ref2 and ref3, and the photons counted by the first counter 910 have lower energy than those counted by the second and third counters 920 and 930. Therefore, if a bit depth of the first counter 910 is equal to 13 bits, a bit depth of the second counter 920 may be equal to 12 bits, which is less than the bit depth of the first counter 910, and a bit depth of the third counter 930 may be equal to 11 bits, which is less than the bit depth of the second counter 920.

Further, the number of photons which have energy values that are greater than the first reference value ref1 may correspond to an area 815 of the graph 810. Since the first counter 910 accumulates and counts the number of the photons which have the energy values greater than the first reference value ref1, the first counter 910 may have a size which corresponds to the area 815.

In addition, the number of photons which have energy values greater than the second reference value ref2 may correspond to an area 825 of the graph 820. Since the second counter 920 accumulates and counts the number of photons which have the energy values greater than the second reference value ref2, the second counter 920 may have a size which corresponds to the area 825.

In addition, the number of photons which have energy values greater than the third reference value ref3 may correspond to an area 935 of the graph 830. Since the third counter 930 accumulates and counts the number of photons which have the energy values greater than the third reference value ref3, the third counter 930 may have a size which corresponds to the area 835.

Figure 10:
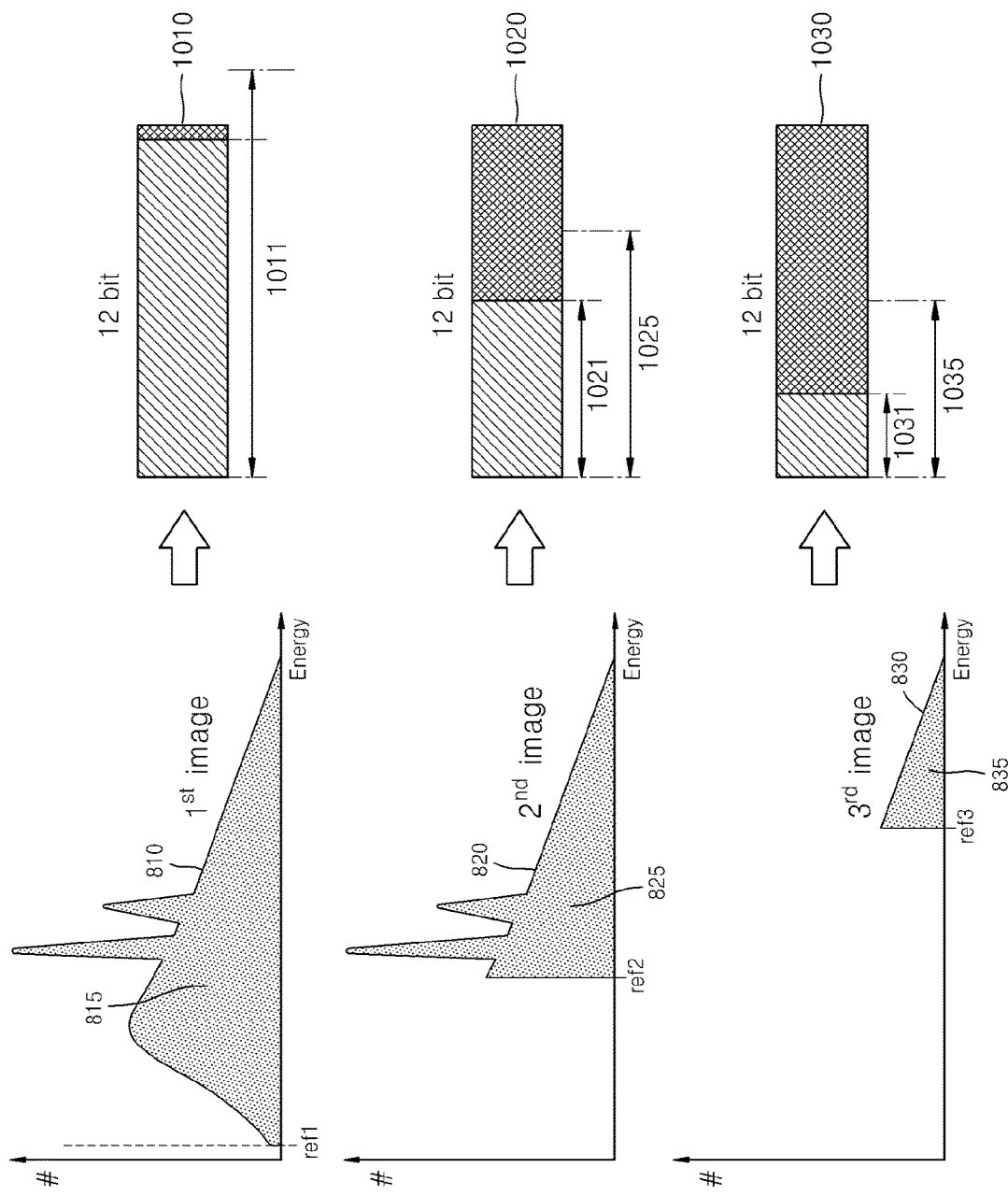
FIG. 10 is a diagram which shows a general radiation detector.

FIG. 10 is a diagram which illustrates a general radiation detector.

In the unit detector 700 according to an exemplary embodiment, if the bit depth of the first counter 910 is equal to 13 bits, the bit depth of the second counter 920 is equal to 12 bits, and the bit depth of the third counter 930 is equal to 11 bits, a total size of the first, second, and third counters 910, 920, and 930 included in the unit detector 700 corresponds to 36 bits.

In a general radiation detector, if a plurality of counters are included in one pixel which is configured for measuring the multi-energy of radiation, the plurality of counters have the same size.

Referring to FIG. 10, in the general radiation detector, the plurality of counters may have the same size. If a total size of the counters included in one pixel is 36 bits, similarly as shown in FIG. 9, each of the plurality of counters 1010, 1020, and 1030 respectively has a 12 bit depth.

For example, assuming that the number of photons which have energy values greater than the first reference value ref1 and which are counted by the first counter 1010 corresponds to 13 bits (as indicated by item 1011), the number of photons which have energy values greater than the second reference value ref2 corresponds to 11 bits (as indicated by item 1025), and the number of photons which have energy values greater than the third reference value ref3 corresponds to 10 bits (as indicated by item 1035).

In the general radiation detector, since the first counter 1010 has a size of 12 bits, the number of photons which have energy values greater than the first reference value ref1 may not all be counted, and the first counter 1010 may become saturated.

When the first counter 1010 is saturated, the second and third counters 1020 and 1030 may not perform a counting operation any further. Therefore, even when the number of photons which have energy values greater than the second reference value ref2 corresponds to 11 bits (as indicated by item 1025), the second counter 1020 stores the number of photons, which is less than 11 bits, as the bit number 1021. In addition, even when the number of photons which have energy values greater than the third reference value ref3 corresponds to 10 bits (as indicated by item 1035), the third counter 1030 stores the number of photons, which is less than 10 bits, as the bit number (1031).

However, in the radiation detector according to an exemplary embodiment, the sizes of the counters may be set to be different from each other based on the reference values that are used to classify the photons, and thus, the number of photons which correspond to each of the energy bands may be counted sufficiently while reducing the sizes of the counters. Accordingly, the number of photons that may be counted may be expanded, and thus, a photon detecting performance in each of the energy bands may be improved.

In detail, referring to FIG. 9, the number of photons (911) counted by the first counter 910 is less than a capacity of the first counter 910, and since the first counter 910 is not saturated until all of the photons having energy values greater than the first reference value ref1 are counted, the second and third counters 920 and 930 may sufficiently count the photons.

Further, as in the second and third counters 1020 and 1030 shown in FIG. 10, the number of remaining bits that have not been used may be removed, and thus, the sizes of the counters may be reduced.

Accordingly, when comparing with the general radiation detector shown in FIG. 10, the number of photons that may be counted may be increased while maintaining the sizes of the counters.

In addition, the number of radiation photons detected by the radiation detector is used to reconstruct a medical image. In detail, the number of photons counted by at least one unit detector included in the radiation detector may correspond to a pixel value of a reconstruction image. Therefore, in a multi-energy CT image, the photons which correspond to each energy band must be sufficiently detected to improve an accuracy of a reconstruction image.

As described above, in the radiation detector of the present exemplary embodiment, the number of photons may be sufficiently counted in each of the plurality of energy bands, and accordingly, the accuracy of the reconstruction image may be improved.

Further, as described above, a front surface area of the pixel receiving the radiation is equal to about 1 mm$^2$, and the radiation absorbing layer 710 may absorb about 200 M photons within one second. It is assumed that the first reference value ref1 corresponds to the minimum energy value of each of the photons. In this case, if the radiation absorbing layer 710 absorbs about 200 M photons, the number of photons which have energy values greater than the first reference value ref1 may be about 200 M. Thus, the first counter 910 may have a size that may store the number of photons, that is, approximately 200 M photons.

In addition, it is assumed that the sub-pixel 401 shown in FIG. 5 corresponds to the unit detector 700, and one pixel absorbs n photons and includes m sub-pixels. In addition, if the first reference value ref1 corresponds to the minimum energy value that a photon may have, the first counter 910 may have a size which is capable of storing an (n/m) number of photons.

As described above, the size of the counter is determined in consideration of the energy values of the photons that are counted by the radiation detector of the present exemplary embodiment, loss of the photons may be reduced, and a measurable range of the number of photons may be increased with respect to each of the energy bands.

Further, in the radiation detector according to an exemplary embodiment, each of the sub-pixels included in one pixel includes a plurality of counters so as to perform the counting of the photons exactly. The radiation detector performs a sampling operation for a predetermined time after detecting the radiation which is incident for a predetermined time. For example, the number of photons incident onto a general radiation detector for one second is about 500M in an area of 1 mm×1 mm. Therefore, in the conventional radiation detector which performs the counting operation of the photons per each pixel, the energy of each of the photons incident for a predetermined sampling time period is measured, and then, the number of photons which have energy values that are equal to or greater than a predetermined value is counted. In a case where 500 M photons are incident to the area of 1 mm×1 mm per second, one photon is sampled for 2 nsec (1/500M). According to Nyquist sampling theory, one photon must be sampled for at least half of the above time, that is, 1 nsec.

However, it is difficult to measure and compare the energy of the photons in order to count the number of photons within 1 nsec. Further, even if a circuit that measures and compares the energy of the photons in order to count the number of photons may perform the above measurement and comparison operations within the above sampling time, a response of the radiation absorbing layer that absorbs the radiation may not be sufficiently small in view of the sampling time. In addition, if a plurality of photons are incident onto the comparator at the same time, the comparison of the energies of the photons may be skewed. In addition, when another photon is incident while comparing and counting one photon energy, the counting operation may not be performed accurately.

Further, in the conventional counting detector, a memory configured for storing the number of photons that are counted may be provided for each pixel, or a memory may store the number of photons that are counted for a plurality of pixels.

As described above with reference to FIG. 5, in the radiation detector according to an exemplary embodiment, each of the plurality of pixels may include m sub-pixels. In addition, each of the sub-pixels includes a plurality of counters which are configured for counting and storing the number of photons. In addition, if one pixel absorbs and counts n photons, the memory in each sub-pixel may have a storage capacity of n/m.

Accordingly, in the radiation detector according to an exemplary embodiment, the photon counting operation is performed in each of the sub-pixels, and the number of photons that one sub-pixel processes is reduced to n/m. Therefore, a sampling time of 1/(n/m) second may be ensured for each of photons. In particular, the sampling time of 1/(n/m) second that is m times longer than the conventional sampling time may be ensured for each of photons, whereas the sampling time for each of photons is 1/n second in the conventional radiation detector. Therefore, the accuracy of counting photons may be improved, and the photons absorbed by the radiation absorbing layer may be sufficiently counted. Further, the number of photons that one counter processes is reduced to n/m, and thus, the photons may be counted accurately even when a plurality of photons are incident at the same time.

In addition, as the counter in each sub-pixel is designed to have a storage capacity of n/m, the size of the counter included in the sub-pixel may be reduced. Accordingly, the radiation detector in which the plurality of counters which correspond to the multi-energy bands may be included in one sub-pixel may be realized.

Figure 11:
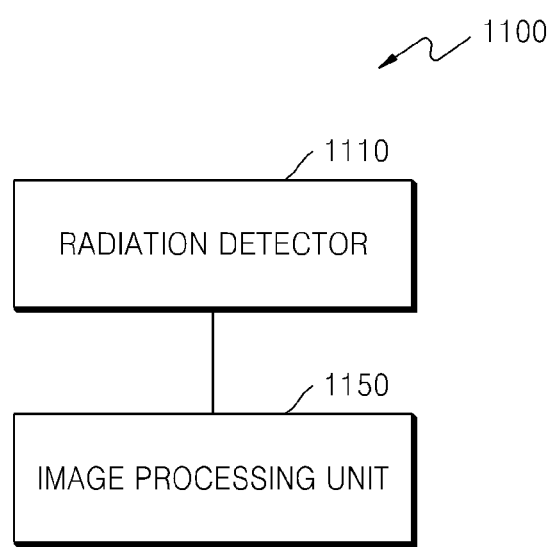
FIG. 11 is a diagram which shows a CT apparatus, according to an exemplary embodiment.

FIG. 11 is a diagram of a CT apparatus 1100, according to an exemplary embodiment.

Referring to FIG. 11, the CT apparatus 1100 according to the present exemplary embodiment includes a radiation detector 1110 and an image processor 1150.

The radiation detector 1110 includes a plurality of unit detectors 700. In particular, the radiation detector 1110 includes a plurality of pixels which are configured to detect radiation. Further, each of the plurality of pixels may include a plurality of sub-pixels, as described with reference to FIG. 5.

In particular, each of the plurality of pixels may include the unit detector 700 shown in FIG. 7. Further, if each of the plurality of pixels includes a plurality of sub-pixels, each of the plurality of sub-pixels may include the unit detector 700.

The radiation detector 1110 has the same configuration as the radiation detector according to an exemplary embodiment as described above with reference to FIGS. 1 to 9, and thus, the same descriptions provided with regard to FIGS. 1 to 9 are not repeated.

The image processor 1150 reconstructs a medical image based on the number of photons detected by the radiation detector 1110. In detail, the image processor 1150 may reconstruct a CT image based on the number of X-ray photons detected by the radiation detector 1110.

Further, the image processor 1150 may be included in a CT system 100. For example, the image processor 1150 may be an element which corresponds to the image processor 126 described with reference to FIG. 2. Alternatively, the image processor 1150 may be an element which corresponds to the external medical apparatus 136 that is connected to the CT system 100 via the wired/wireless network 301.

In particular, if each of the plurality of pixels includes the unit detector 700 so as to perform the radiation counting operation by the pixel unit, one pixel value of the CT image may be generated by using the number of photons counted by at least one unit detector 700 which is included in the radiation detector 1110.

For example, one pixel value of the CT image may be generated by using the number of photons counted by one pixel which is included in the radiation detector 1110.

Further, in the radiation detector 1110, if one pixel includes a plurality of sub-pixels, and each of the sub-pixels includes the unit detector 700 configured to perform the radiation counting operation by the sub-pixel unit, one pixel value of the CT image may be generated by using the number of photons counted by at least one sub-pixel.

For example, one image pixel value of the CT image may be generated by using the number of photons counted by one sub-pixel. In FIG. 7, one image pixel value of a first image which corresponds to an energy band greater than the first reference value ref1 may be generated by using the number of photons counted by the first counter 751. In addition, one image pixel value of a second image which corresponds to an energy band greater than the second reference value ref2 may be generated by using the number of photons counted by the second counter 752. In addition, one image pixel value of a third image which corresponds to an energy band greater than the third reference value ref3 may be generated by using the number of photons counted by the third counter 753.

As another example, the number of photons counted by the plurality of sub-pixels may correspond to one image pixel value of a reconstruction image. In particular, the plurality of sub-pixels may be grouped, and one image pixel value of the CT image may be generated by using the number of photons counted by one group which includes the plurality of sub-pixels.

Figure 12A:
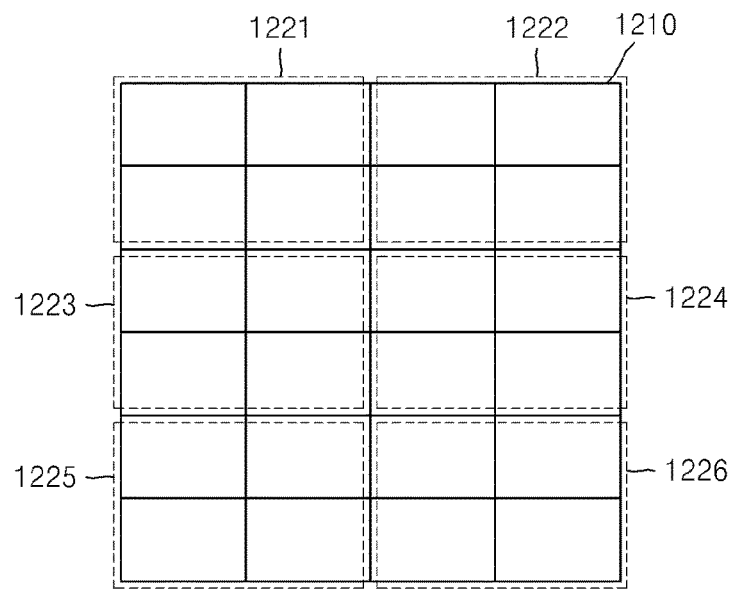
FIGS. 12A and 12B are diagrams which illustrate a generation of image pixel values of a CT image.
Figure 12B:
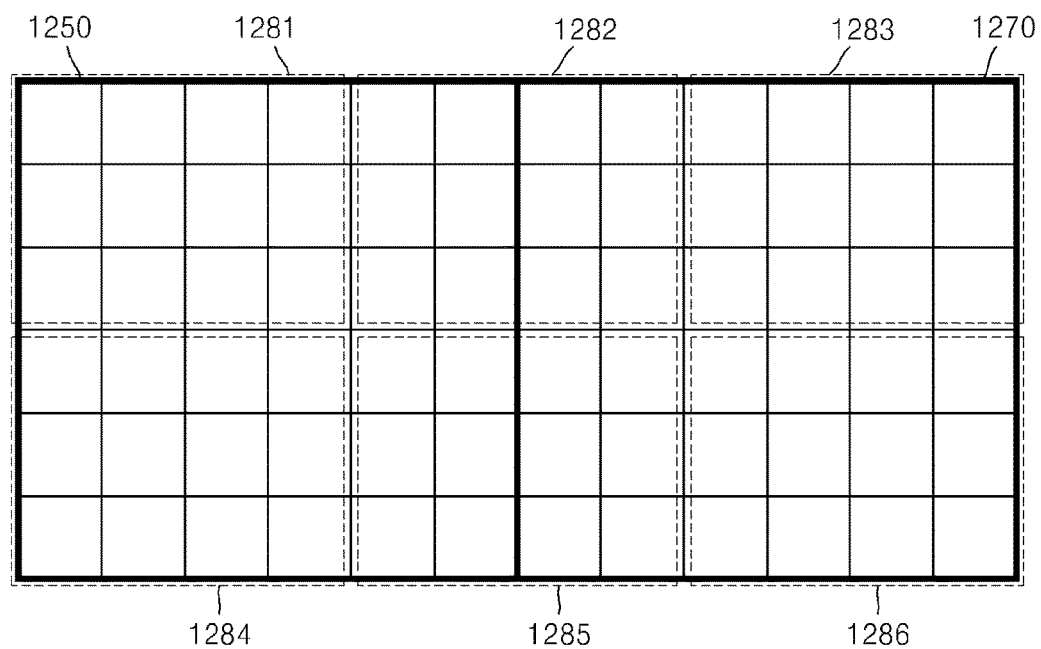

FIGS. 12A and 12B are diagrams which illustrate a generation of image pixel values in a CT image.

FIG. 12A illustrates, as an example, a case in which one pixel 1210 includes 24 sub-pixels (6×4 sub-pixels). In addition, FIG. 12B illustrates, as an example, a case in which one pixel 1250 includes 36 sub-pixels (6×6 sub-pixels).

Referring to FIG. 12A, the total number of photons counted by each of sub-pixel groups 1221, 1222, 1223, 1224, 1225, and 1226 which are included in one pixel 1210 and which includes the plurality of sub-pixels arranged adjacent to each other may correspond to one image pixel value of the reconstructed image. In particular, the total number of photons counted by one sub-pixel group (for example, 1221) may correspond to one image pixel value of the reconstructed CT image.

For example, one image pixel value of the reconstruction image for each of the energy bands may be generated by using the number of photons for each of the energy bands counted by the sub-pixel group (for example, sub-pixel group 1221).

FIG. 12A illustrates an example of a case where one sub-pixel group which corresponds to one image pixel value includes four sub-pixels. If one pixel includes 24 sub-pixels (6×4 sub-pixels), one pixel may be divided into six groups so that one pixel may generate six image pixel values in the reconstruction image.

As another example, the 24 sub-pixels included in one pixel may be classified as four sub-pixel groups, each of which includes six sub-pixels, so that one pixel may generate four image pixel values in the reconstruction image.

FIG. 12B shows two adjacent pixels 1250 and 1270.

In the radiation detector 1110, the plurality of sub-pixels included in the plurality of pixels are classified in the plurality of sub-pixel groups, and the number of photons counted by one of the groups may correspond to one image pixel value of the reconstruction image.

Referring to FIG. 12B, 72 sub-pixels included in two adjacent pixels 1250 and 1270 may be divided into six groups 1281, 1282, 1283, 1284, 1285, and 1286, as shown in FIG. 12B. In detail, one image pixel value of the reconstruction image may be determined based on a total number of photons counted by 12 sub-pixels included in one group (for example, sub-pixel group 1281).

The image processor 1150 may adjust the number of sub-pixels that are used to generate one image pixel value in the CT image based on a resolution of the reconstructed CT image. For example, if a CT image with ultra-high resolution is to be generated, the image processor 1150 may generate one image pixel value in the reconstructed CT image by using the number of photons counted by one sub-pixel.

Other exemplary embodiments can also be implemented through computer readable code/instructions in/on a medium, e.g., a computer readable medium, which is configured to control at least one processing element to implement any above described exemplary embodiment. The medium can correspond to any transitory or non-transitory medium/media which permits the storage and/or transmission of the computer readable code.

The computer readable code can be recorded and/or transferred on a medium in any one or more of a variety of ways. Examples of the medium including recording media, such as magnetic storage media (e.g., ROM, floppy disks, hard disks, etc.) and optical recording media (e.g., CD-ROMs, or DVDs), and transmission media such as Internet transmission media.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present inventive concept as defined by the following claims.

What is claimed is:

1. A radiation detector which includes a plurality of pixels including a plurality of unit detectors configured to detect radiation, wherein each of the plurality of unit detectors comprises:
    a radiation absorbing layer configured to convert incident photons into electric signals;
    a plurality of comparators configured to compare each of the electric signals with a respective one of a plurality of reference values which have different values than each other, in order to classify the photons in a plurality of energy bands; and
    a plurality of counters, which have different sizes than each other and are respectively and independently connected with the plurality of comparators, configured to count and store a respective number of photons that are classified in each of the plurality of energy bands, and
    wherein a size of a first counter from among the plurality of counters is greater than a size of a second counter when a first reference value applied to a first comparator connected to the first counter from among the plurality of comparators is smaller than a second reference value applied to a second comparator connected to the second counter, and
    wherein at least one pixel comprises a plurality of unit detectors divided into at least two sub-pixel groups, the at least two sub-pixel groups including a first sub-pixel group and a second sub-pixel group and a first image pixel value in a computed tomography (CT) image is generated based on the first sub-pixel group and a second image pixel value in the CT image is generated based on the second sub-pixel group.

2. The radiation detector of claim 1, wherein the sizes of the plurality of counters vary inversely with respect to the corresponding plurality of reference values.

3. The radiation detector of claim 1, wherein each of the plurality of counters has a first bit depth if an energy band in which the corresponding photons are classified is a low energy band, and a second bit depth that is less than the first bit depth if the energy band in which the corresponding photons are classified is a high energy band.

4. The radiation detector of claim 1, wherein the respective size of each of the counters varies based on at least one from among the reference values, a type of radiation being detected by the radiation detector, and an energy band of a reconstruction energy of the radiation being detected by the radiation detector.

5. The radiation detector of claim 1, wherein the radiation absorbing layer is disposed on a front portion of the radiation detector, and each of the plurality of comparators and each of the plurality of counters is disposed on a rear portion of the radiation detector.

6. The radiation detector of claim 1, wherein the radiation absorbing layer is formed of at least one from among cadmium telluride (CdTe) and cadmium zinc telluride (CdZnTe).

7. A radiation detector comprising a plurality of pixels configured to detect radiation, wherein each of the plurality of pixels comprises a plurality of sub-pixels, and each of the plurality of sub-pixels comprises:
a radiation absorbing layer configured to convert incident photons into electric signals;
a plurality of comparators configured to compare the electric signals with a respective one of a plurality of reference values which have different values than each other, in order to classify the photons in a plurality of energy bands; and
a plurality of counters, which have different sizes than each other and are respectively and independently connected with the plurality of comparators, configured to count and store a respective number of photons that are classified in each of the plurality of energy bands, and
wherein a size of a first counter from among the plurality of counters is greater than a size of a second counter when a first reference value applied to a first comparator connected to the first counter from among the plurality of comparators is smaller than a second reference value applied to a second comparator connected to the second counter, and
wherein at least one pixel comprises a plurality of unit detectors divided into at least two sub-pixel groups, the at least two sub-pixel groups including a first sub-pixel group and a second sub-pixel group and a first image pixel value in a computed tomography (CT) image is generated based on the first sub-pixel group and a second image pixel value in the CT image is generated based on the second sub-pixel group.

8. A computed tomography (CT) apparatus comprising:
a radiation detector comprising a plurality of pixels, each of the plurality of pixels comprising a respective plurality of sub-pixels configured to detect radiation; and
an image processor configured to reconstruct a CT image based on a number of photons detected by the radiation detector,
wherein each of the each respective plurality of sub-pixels comprises:
a radiation absorbing layer configured to convert incident photons into electric signals;
a plurality of comparators configured to compare each of the electric signals with a respective one of a plurality of reference values which have different values than each other, in order to classify the photons in a plurality of energy bands; and
a plurality of counters, which have different sizes than each other and are respectively and independently connected with the plurality of comparators, configured to count and store a number of photons that are classified in each of the plurality of energy bands, and
wherein a size of a first counter from among the plurality of counters is greater than a size of a second counter when a first reference value applied to a first comparator connected to the first counter from among the plurality of comparators is smaller than a second reference value applied to a second comparator connected to the second counter, and
wherein the image processor is further configured to generate a first image pixel value in the CT image and a second image pixel value in the CT image by dividing a second plurality of sub-pixels included in at least one pixel into at least a first sub-pixel group and a second subpixel group, wherein the at least one pixel comprises a plurality of unit detectors divided into the at least first sub-pixel group and the second sub-pixel group, and wherein the first image pixel value is generated based on the first sub-pixel group and the second image pixel value is generated based on the second sub-pixel group.

9. The CT apparatus of claim 8, wherein each of the at least two sub-pixel groups includes a plurality of sub pixels included in one pixel.

10. The CT apparatus of claim 8, wherein each of the at least two sub-pixel groups includes a plurality of sub pixels included in at least two adjacent pixels.

11. A method for using a radiation detector which includes a plurality of pixels including a plurality of unit detectors configured to detect radiation to process detected radiation, each of the plurality of unit detector including a radiation absorbing layer, a plurality of comparators, and a plurality of counters, and the method comprising:
converting, by the radiation absorbing layer, incident photons into electric signals;
comparing, by the plurality of comparators, each of the electric signals with a respective one of a plurality of reference values which have different values than each other, in order to classify the photons in a plurality of energy bands; and
counting and storing, by the plurality of counters which have different sizes than each other and are respectively and independently connected with the plurality of comparators, a respective number of photons that are classified in each of the plurality of energy bands, and
wherein a size of a first counter from among the plurality of counters is greater than a size of a second counter when a first reference value applied to a first comparator connected to the first counter from among the plurality of comparators is smaller than a second reference value applied to a second comparator connected to the second counter, and
wherein at least one pixel comprises a plurality of unit detectors divided into at least two sub-pixel groups, the at least two sub-pixel groups including a first sub-pixel group and a second sub-pixel group and a first image pixel value in a computed tomography (CT) image is generated based on the first sub-pixel group and a second image pixel value in the CT image is generated based on the second sub-pixel group.

12. The method of claim 11, wherein the comparing comprises:
using a first comparator to compare each of the electric signals with a first reference value;
using a second comparator to compare each of the electric signals with a second reference value; and using a third comparator to compare each of the electric signals with a third reference value.

13. The method of claim 12, wherein the counting and storing comprises:
using a first counter to count and store a number of photons which have energy values greater than the first reference value, based on a result of the comparison performed by the first comparator;
using a second counter to count and store a number of photons which have energy values greater than the second reference value, based on a result of the comparison performed by the second comparator; and
using a third counter to count and store a number of photons which have energy values greater than the third reference value, based on a result of the comparison performed by the third comparator.

14. A method for using a computed tomography (CT) apparatus to generate a CT image, the CT apparatus including a radiation detector which includes at least one unit detector configured to detect radiation, each of the at least one unit detector including a radiation absorbing layer, a plurality of comparators, and a plurality of counters, and the method comprising:
detecting, by the radiation detector, incident radiation; and
generating, by an image processor, the CT image based on a number of photons detected by the radiation detector, wherein the detecting comprises:
converting, by the radiation absorbing layer, incident photons into electric signals;
comparing, by the plurality of comparators, each of the electric signals with a respective one of a plurality of reference values which have different values from each other, in order to classify the photons in a plurality of energy bands; and
counting and storing, by the plurality of counters which have different sizes than each other and are respectively and independently connected with the plurality of comparators, a respective number of photons that are classified in each of the plurality of energy bands, and
wherein a size of a first counter from among the plurality of counters is greater than a size of a second counter when a first reference value applied to a first comparator connected to the first counter from among the plurality of comparators is smaller than a second reference value applied to a second comparator connected to the second counter, and
wherein each of the at least one unit detector comprises a pixel, and the pixel includes a respective plurality of sub-pixels, and
wherein the generating the CT image comprises generating a first image pixel value in the CT image and a second image pixel in the CT image by dividing a corresponding plurality of sub-pixels into at least a first sub-pixel group and a second sub-pixel group, wherein the at least one pixel comprises a plurality of unit detectors divided into the at least first sub-pixel group and the second sub-pixel group, and wherein the first image pixel value is generated based on the first sub-pixel group and the second image pixel value is generated based on the second subpixel group.

* * * * *